Figure 1:
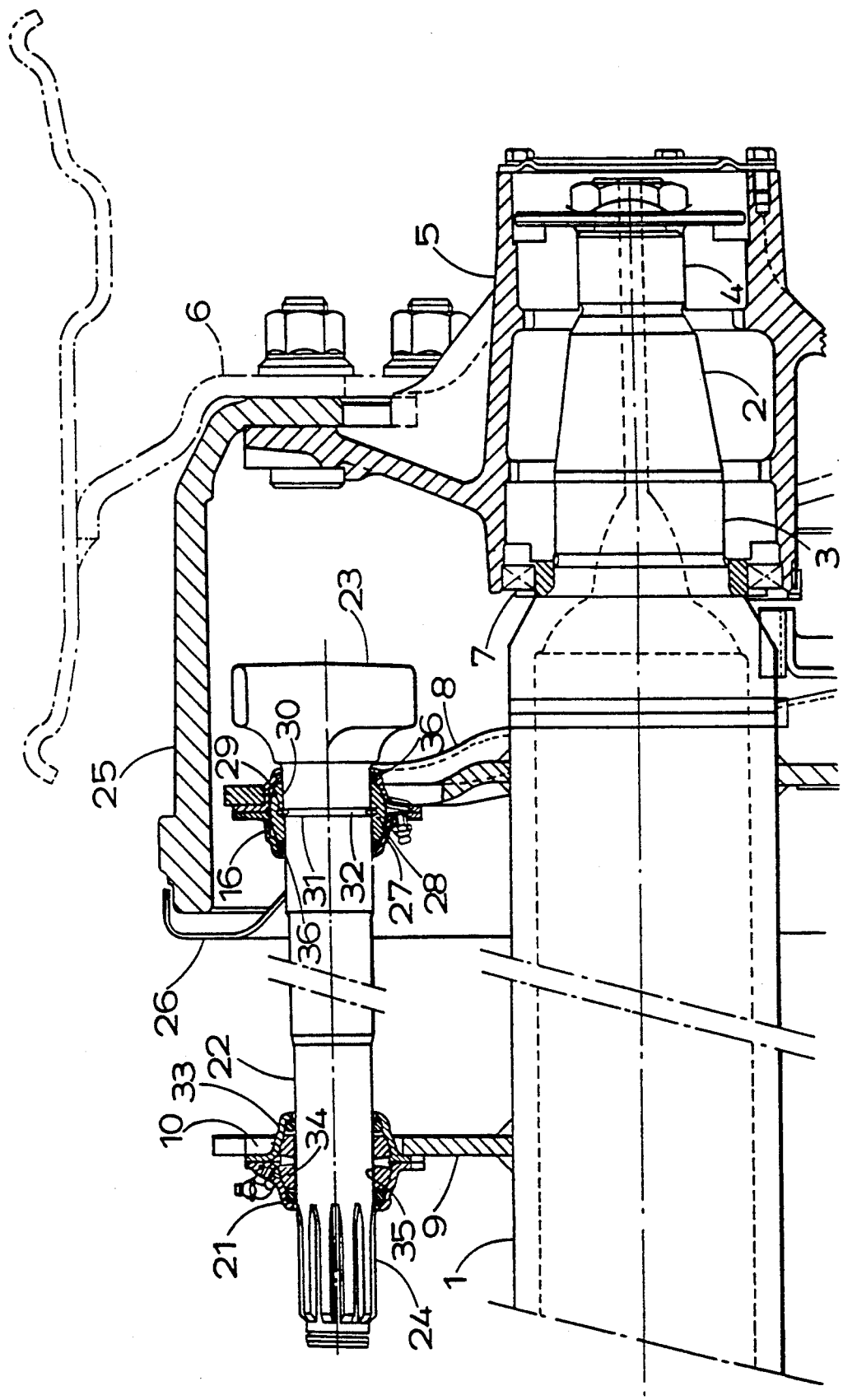

United States Patent [19]
Layfield

[11] Patent Number: 5,316,111
[45] Date of Patent: May 31, 1994

[54] VEHICLE AXLE BEAM AND BRAKE ASSEMBLY

[75] Inventor: Jonathon M. H. Layfield, Cranfield, England

[73] Assignee: Rubery Owen-Rockwell Limited, Wednesbury, United Kingdom

[21] Appl. No.: 917,114

[22] PCT Filed: Dec. 5, 1990

[86] PCT No.: PCT/GB90/01897
§ 371 Date: Aug. 6, 1992
§ 102(e) Date: Aug. 6, 1992

[87] PCT Pub. No.: WO91/09235
PCT Pub. Date: Jun. 27, 1991

[30] Foreign Application Priority Data
Dec. 7, 1989 [GB] United Kingdom ........... 8927638

[51] Int. Cl.$^5$ .......... F16D 51/22; F16D 65/22; F16C 23/04
[52] U.S. Cl. .......... 188/205 R; 188/206 R; 188/341
[58] Field of Search .......... 188/324, 329, 330, 332, 188/338, 339, 205 R, 206 R, 325, 341, 18 A, 18 R, 17; 192/78, DIG. 1

[56] References Cited

U.S. PATENT DOCUMENTS

| | | | |
|---|---|---|---|
| 1,878,911 | 9/1932 | Stoner | 188/329 |
| 2,331,652 | 10/1943 | Buckendale | 188/205 R |
| 2,892,662 | 6/1959 | Scheel | 188/205 R X |
| 3,106,991 | 10/1963 | Winge | 188/332 |
| 3,650,360 | 3/1972 | King et al. | 188/330 |
| 4,337,851 | 2/1982 | Pringle | 188/330 |

FOREIGN PATENT DOCUMENTS
1183469 3/1970 United Kingdom .

Primary Examiner—Douglas C. Butler
Attorney, Agent, or Firm—Spensley Horn Jubas & Lubitz

[57] ABSTRACT

A brake camshaft (22), having a cam (23) at one end for actuation by rotation of the camshaft to expand the brake shoes of a drum brake, has two spaced bearing assemblies (16, 21), preferably both self-aligning, releasably secured on an axle beam (1) at mountings (8, 9). The mountings have apertures, conveniently slots (10, 13), at least one of which is open or openable laterally of the brake camshaft (22) to enable the camshaft (22) to be manoeuvred, with tilting or lateral movement, out of engagement with the apertures when the bearing assemblies (16, 21) have been released from the mountings, to withdraw the camshaft with its bearing assemblies from the mountings. In one example the mounting (9) remote from the cam, a bearing mounting bracket, has an open-ended slot (10) opening to the edge of the mounting for withdrawal of the camshaft, and the other mounting (8) has a slot (13) with which the cam (23) has to be aligned for withdrawal. The arrangement enables the brake camshaft (22) to be removed with its bearing assemblies (16, 21) without having to disturb the wheel hub.

14 Claims, 5 Drawing Sheets

VEHICLE AXLE BEAM AND BRAKE ASSEMBLY

This invention relates to a vehicle axle beam and brake assembly of the kind in which an internal shoe drum brake is operated by a brake camshaft supported for rotation by two spaced bearing assemblies carried by the axle beam, one of the bearing assemblies being supported on the axle beam by a brake anchor bracket, and the brake camshaft having at one end nearest to the brake anchor bracket a cam by means of which brake shoes are caused to be actuated upon rotation of the brake camshaft. Such a vehicle axle beam and brake assembly is hereinafter referred to as "of the type described". The axle beam may, for example, be a trailer axle having S cam operated brakes.

Conventionally, the brake camshaft in an assembly of the type described is supported at the cam end in a plain bearing at the brake anchor bracket and in a spherical bearing adjacent its other end. One such construction is illustrated and described in British patent no. 1183469 of North American Rockwell Corporation. The spherical bearing is mounted on the axle beam and the brake anchor bracket, after machining, is secured on the axle beam as by welding.

Servicing of the bearing at the anchor bracket requires removal of the brake drum and the associated hub and bearing assembly to enable the brake camshaft to be withdrawn and so allow bearing removal. This is time consuming and introduces a risk that, on re-assembly, the hub and bearing assembly may not be adjusted correctly, so adversely affecting bearing assembly life.

Welding of the brake anchor bracket to the axle beam can introduce some distortion. Because of this a bush of the plain bearing in which the brake camshaft is received has to have appreciable clearance from the brake camshaft to allow for any misalignment at the anchor bracket. This results in many kilometers of use being required to bed in new brake linings before optimum brake performance is obtained, and this is undesirable. The clearance necessary also acts to promote more rapid wear of the plain bearing by allowing access of road dirt and wash out of lubricant because seals provided at each end of the bush cannot be properly effective, increasing the necessary frequency of servicing.

The present invention seeks to facilitate withdrawal of the brake camshaft and its bearings for servicing and maintenance.

According to the present invention there is provided a vehicle axle beam and brake assembly comprising an internal shoe drum brake having brake shoes operated by a brake camshaft supported for rotation by two spaced, first and second, bearing assemblies carried by an axle beam, the first bearing assembly being supported on the axle means by a brake anchor bracket having opposite first and second sides, and the brake camshaft having adjacent and remote ends respectively near to and remote from the brake anchor bracket and a cam at said adjacent end by means of which the brake shoes are caused to be actuated upon rotation of the brake camshaft, the first bearing assembly being releasably mounted on a first mounting at the brake anchor bracket having an aperture of a shape to allow the cam to be passed therethrough and through which the brake camshaft extends so that the cam is adjacent said first side of the brake anchor bracket and the brake camshaft extends from said second side to the second bearing assembly, the second bearing assembly being releasably secured to the axle means at a second mounting and having an aperture through which the brake camshaft extends, and the aperture of at least one of the mountings being open or openable laterally of the brake camshaft, the construction and arrangement being such that when the bearing assemblies have been released from the mountings the apertures enable the brake camshaft, with both of the bearing assemblies thereon, to be manoeuvred to pass the cam from said first side to said second side of the brake anchor bracket and withdraw the brake camshaft and the bearing assemblies from the mountings.

The apertures of both mountings may be open or openable laterally of the brake camshaft and enable the camshaft to be withdrawn laterally from the apertures. Where the aperture at only one of the mountings is open or openable that aperture is conveniently at the second mounting. The aperture at the first mounting may then be in the form of a slot through which the cam can be drawn when suitably orientated to disengage the camshaft from that mounting, either before or after the camshaft has been disengaged from the aperture at the second mounting. The required manoeuvring of the camshaft may comprise tilting to enable the end of the brake camshaft remote from the cam to be withdrawn from the second mounting through the open or openable aperture, and the cam to be drawn through the slot of the first mounting at the brake anchor bracket.

The slot of the first mounting at the brake anchor bracket may, for example, be an open slot, a slot open at one end with a removable closing member, or a closed slot. The slot may be of a keyhole shape having a part-circular portion with which the respective bearing assembly is registered and an extension portion with which the cam has to be aligned to allow withdrawal of the brake camshaft from the first mounting.

The slot of the first mounting may be open or openable to enable the brake camshaft to be tilted to allow its end remote from the cam to be withdrawn from the second mounting and to allow the brake camshaft to be drawn through it for disengagement from the first mounting.

The aperture at the second mounting may also be in the form of a slot which may similarly be of a keyhole shape with a part-circular portion with which the respective bearing assembly registers and an extension portion by way of which the brake camshaft is able to be moved laterally or tilted to be withdrawn from the second mounting.

Preferably both bearing assemblies for the brake camshaft are of a self-aligning, for example spherical, type able to accommodate any misalignment at the brake anchor bracket whilst maintaining a relatively reduced running clearance from the brake camshaft at the brake anchor bracket, and allowing for deflection of the axle beam in use without imparting corresponding loading between the brake camshaft and its bearing assemblies, thereby reducing wear and corresponding need for maintenance.

Figure 2:
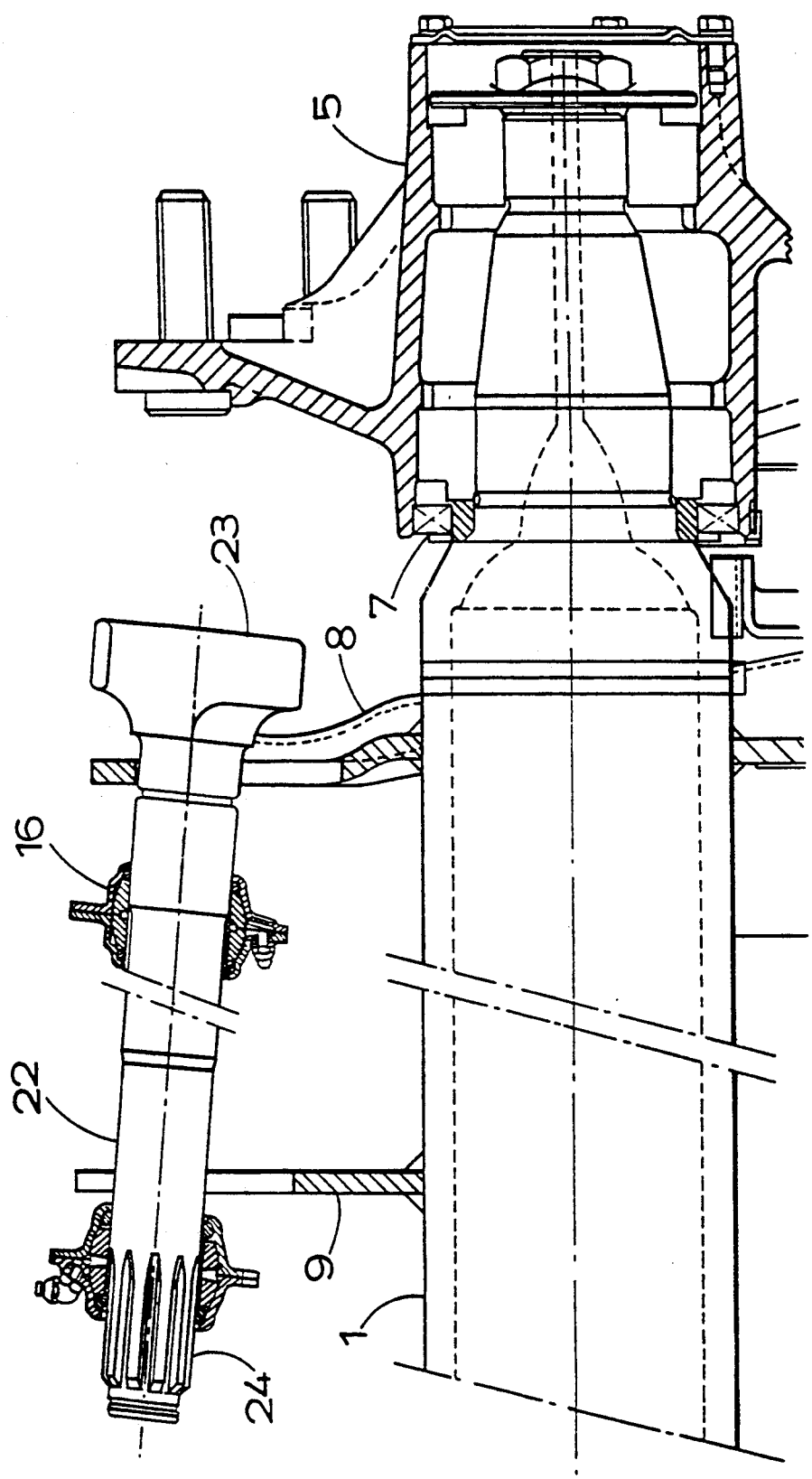
Figure 3:
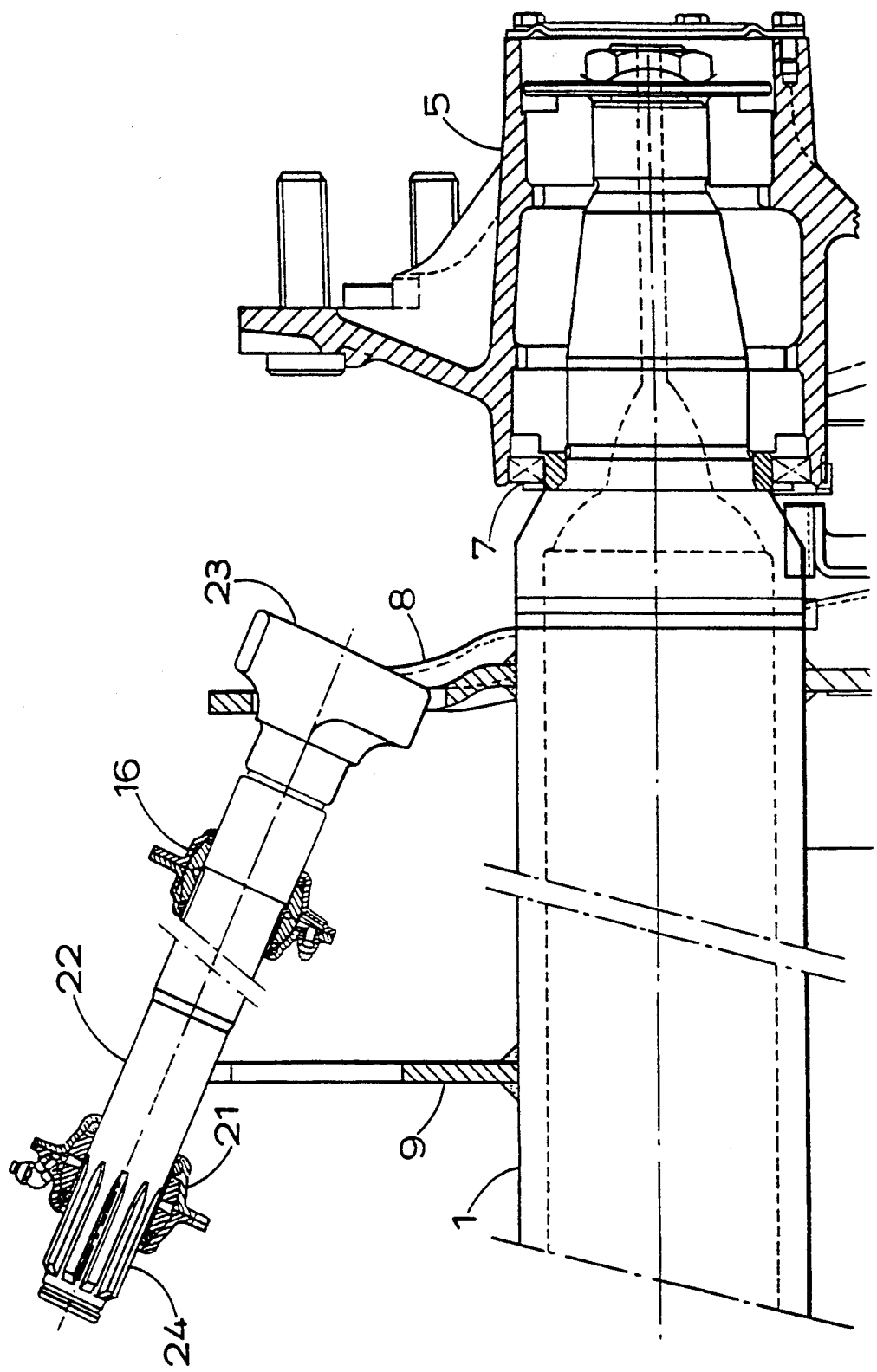
Figure 4:
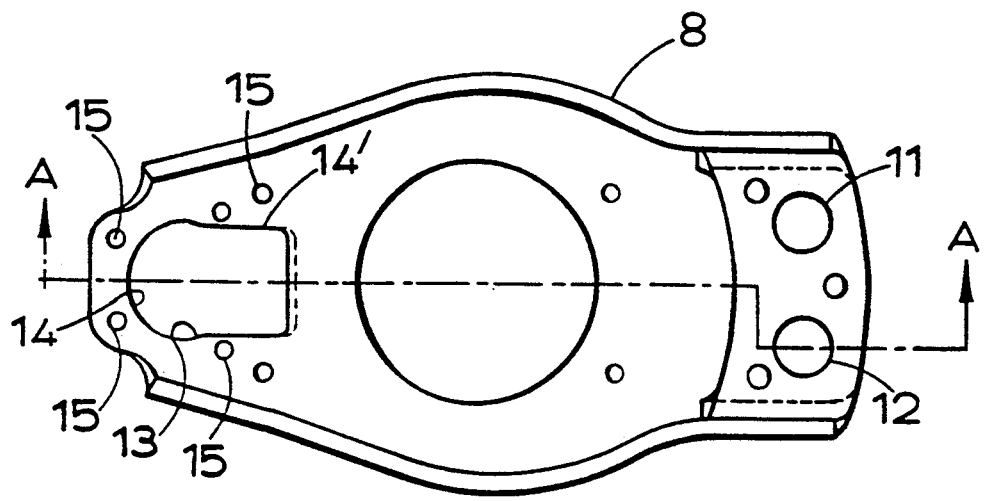
Figure 5:
Figure 6:
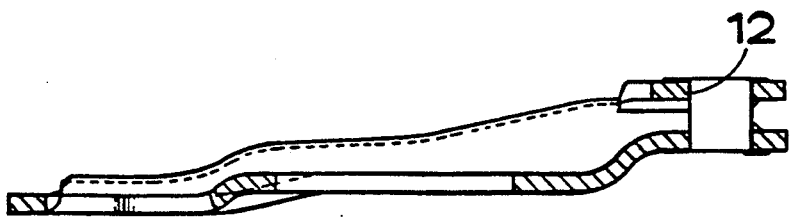
Figure 7:
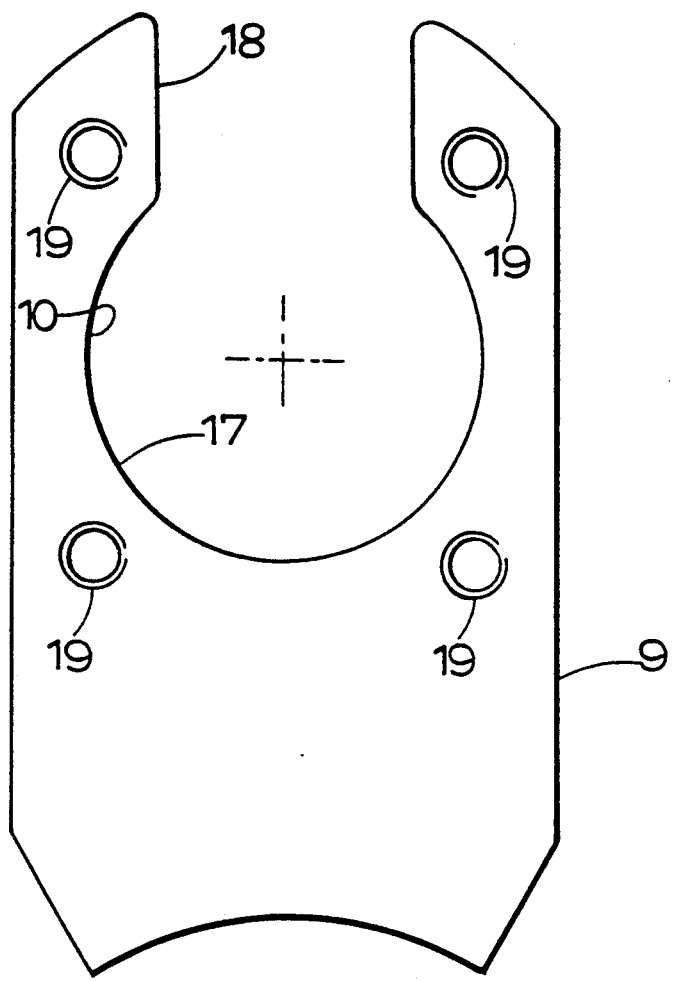
Figure 8:
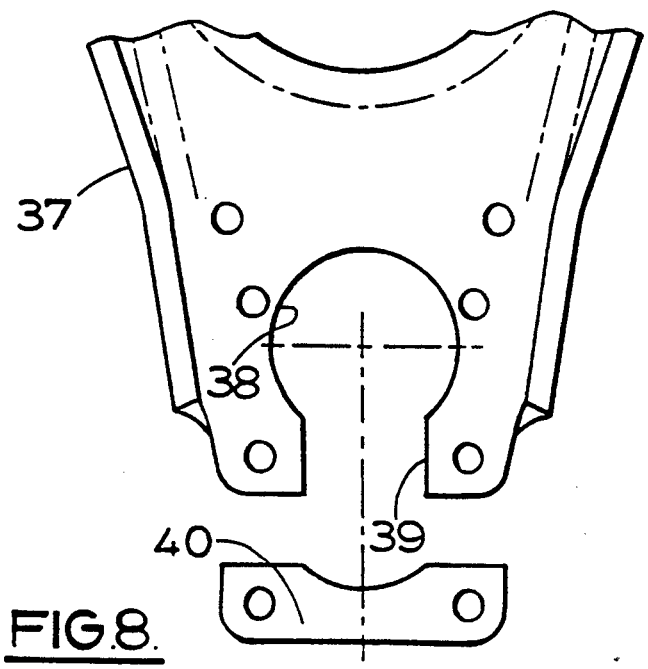

An embodiment of the invention will now be described by way of example with reference to the accompanying drawings in which:

FIG. 1 is a side elevation, partly in section, showing one end of an axle beam and a brake camshaft mounted in spherical bearing assemblies on the axle beam, FIGS. 2 and 3 are similar to FIG. 1 but showing successive stages in withdrawal of the camshaft and its bearing assemblies from the axle beam, FIG. 4 is a front elevation of a brake anchor bracket, FIG. 5 is a plan view on the brake anchor bracket of FIG. 4, FIG. 6 is a section on line A—A of FIG. 4, FIG. 7 is a front elevation of an open slotted bearing mounting bracket, and FIG. 8 is a scrap view of part of FIG. 4, on a larger scale, modified to show an open slot mounting at the brake anchor bracket.

Referring to FIG. 1 of the accompanying drawings, an axle beam 1, only one end of which is shown (the other end being a mirror image thereof), has at each end a spindle end 2 with machined surfaces 3, 4 on which is rotatably mounted by bearings (not illustrated) a hub 5 (only part of which is shown) carrying a wheel 6. A seal 7 is provided between the spindle end 2 and the hub 5. An elongated brake anchor bracket 8, for example of fabricated construction, is secured centrally of its length to the axle beam 1 by welding. A bearing mounting bracket 9 (best seen in FIG. 7), also elongated and having an open keyhole slot 10 opening to one end, is secured to the axle beam 1 by welding, inboard of the brake anchor bracket 8.

Referring now to FIGS. 4 to 6 of the drawings, the brake anchor bracket 8 has two bushes 11, 12 to receive anchor pins on which brake shoes (not shown) are mounted for pivotal movement. The bracket 8 also has a keyhole slot 13 comprising a part-circular portion 14 and a parallel-sided extension portion 14'. Four holes 15 are drilled and tapped in the bracket adjacent to the keyhole slot 13 to receive bolts, not shown, which secure an outboard spherical bearing assembly 16, FIG. 1, to the bracket at that slot.

The bearing mounting bracket 9 is secured to the axle beam 1 so that a part-circular portion 17, FIG. 7, of its open keyhole slot 10 is aligned with the part-circular portion 14 of the keyhole slot 13 in the brake anchor bracket 8. An open-ended parallel-sided extension 18 of the slot 10 extends from the part-circular portion 17 to the adjacent end of the bracket. The bracket 9 also has four drilled and tapped holes 19 around the part-circular portion 17 of the slot 10 by which an inboard spherical bearing assembly 21, FIG. 1, is secured to the bracket 9, as by bolts, not shown.

Referring again to FIG. 1, at each end of the axle beam 1 there is a brake camshaft 22 which extends parallel to the axle beam and has an S cam 23 at its outboard end and splines 24 at its inboard end. The camshaft 22 is supported in the outboard and inboard spherical bearing assemblies 16, 21 for rotation. The S cam 23 engages the ends of the brake shoes (not shown) opposite those ends which are pivotally mounted at the bushes 11, 12 of the brake anchor bracket 8. Rotation of the camshaft 22 by a lever (not shown) mounted on the splines 24 expands the brake shoes to engage a brake drum 25 carried by the hub 5. A dust cover 26 is secured, as by bolts, not shown, to the brake anchor bracket 8.

The outboard bearing assembly 16 on each brake anchor bracket comprises a housing 27 by which the bearing assembly is secured to the bracket and in which is tiltably located a part-spherical bush 28, FIG. 1, having a central annulus 29 in the form of a groove in its bore 30. A corresponding annulus 31 is provided in the associated camshaft 22 and an oval-shaped snap ring 32 is engaged between the two annuli to locate the camshaft 22 in the bearing assembly. The inboard bearing assembly 21 on each bearing mounting bracket 9 similarly comprises a housing 33 which is secured to that bracket at the part-circular portion 17 of the keyhole slot 10 and in which a bush 34 with a bore 35 is tiltably located. The camshaft engages in the bore 34 but since it is located by the annuli and snap ring 32 of the associated outboard bearing assembly 16 further such retention at the inboard bearing assembly is unnecessary.

Each brake camshaft 22, with its associated bearing assemblies 16, 21, is readily removed from the axle beam 1 for servicing without (unlike the conventional practice) having to remove the hub 5. This is accomplished by removal of the dust cover 26 and brake drum 25 and release of the bearing assemblies 16, 21 from the brake anchor bracket 8 and the bearing mounting bracket 9 respectively. The open-ended portion 18 of the slot 10 then allows the camshaft 33 to be tilted so that its inboard end lifts out of the slot. Alignment of the S cam 23 with the parallel-sided portion 14' of the keyhole slot 13 in the brake anchor bracket 8, by rotation of the camshaft allows the cam end of the camshaft, to be withdrawn from the brake anchor bracket so that the camshaft and bearing assemblies can be lifted clear for servicing. Re-assembly is the reverse of the removal operation. Successive stages in removal of the camshaft and bearing assemblies are shown in FIGS. 2 and 3 of the drawings.

It will be appreciated that the fitting of the two spherical bearing assemblies to each brake camshaft compensates for any slight misalignment of the respective brake anchor bracket 8 and mounting bracket 9 and also renders the camshaft and bearings assembly independent of any flexure of the axle beam which occurs in use. These factors enable new brake linings to "bed in" rapidly in use to give early optimum brake performance, help to reduce wear of the bearing assemblies and also facilitate the servicing and maintenance of the camshaft and bearing assemblies.

The clearances earlier referred to between the plain bearing bush and the camshaft in known constructions is of the order of 0.66 mm on diameter. The construction provided in the embodiment described enables the diametrical clearance at the bush of the bearing assembly at the brake anchor bracket to be reduced, typically to the order of 0.15 mm. In addition to the advantages already described this reduction in clearance also enables O-ring seals 36 on the brake camshaft provided in the housing 27 of each bearing assembly 16 at each end of the bush 28 to function efficiently.

Referring now to FIG. 8, the brake camshaft bearing end of a brake anchor bracket 37 is shown which is generally similar to the brake anchor bracket 8 described above but has a modified keyhole slot 38. The keyhole slot 38 has been inverted and its extension portion 39 now opens to the adjacent edge of the brake anchor bracket 37 to allow withdrawal of the cam end of the brake camshaft. In this construction provision may be made to fit a removable member in the form of a bridge piece 40 to the brake anchor bracket 37 to enhance the structural integrity of the bracket. The bridge piece 40 may be secured by bolting, utilising the outer two holes provided for securing the bearing assembly 16 to the brake anchor bracket. With this modification the brake camshaft may be withdrawn, again with its bearing assemblies, from the slots of the two mountings by lateral movement without the need for tilting or for the cam to be aligned with the extension portion 39 of the keyhole slot 38 of the brake anchor bracket.

I claim:

1. A vehicle axle beam and brake assembly comprising an internal shoe drum brake having brake shoes operated by a brake camshaft (22) supported for rotation by two spaced, first and second, bearing assemblies (16, 21) carried by an axle beam (1), the first bearing assembly (16) being supported on the axle beam by a brake anchor bracket (8;37), having opposite first and second sides, and the brake camshaft having adjacent and remote ends respectively near to and remote from the brake anchor bracket and a cam (23) at said adjacent end by means of which the brake shoes are caused to be actuated upon rotation of the brake camshaft, the first bearing assembly (16) being releasably mounted on a first mounting at the brake anchor bracket having an aperture (13;38) of a shape to allow the cam (23) to be passed therethrough and through which the brake camshaft (22) extends so that the cam is adjacent said first side of the brake anchor bracket and the brake camshaft extends from said second side to the second bearing assembly, the second bearing assembly (21) being releasably secured to the axle beam (1) at a second mounting (9) also having an aperture (10) through which the brake camshaft extends, and the aperture (10;38) of at least one of the mountings being open or openable laterally of the brake camshaft to enable the brake camshaft, the construction and arrangement being such that when the bearing assemblies have been released from the mountings the apertures enable the brake camshaft, with both of the bearing assemblies thereon, to be manoeuvred to pass the cam from said first side to said second side of the brake anchor bracket and withdraw the brake camshaft and the bearing assemblies from the mountings.

2. An assembly according to claim 1 wherein the apertures (10;38) of both of the mountings are open or openable laterally of the brake camshaft (22) for disengagement of the brake camshaft from the mountings.

3. An assembly according to claim 2 wherein the apertures (10;38) are each in the form of a slot which has an open end, and the first mounting has a closing member (40) removably attached thereto which closes said open end of the slot at the first mounting.

4. An assembly according to claim 1 wherein the aperture (10) at the second mounting (9) is open or openable and the aperture (38) at the first mounting is a slot, the aperture (38) at the first mounting enabling the brake camshaft (22) to be tilted to allow its said remote end to be withdrawn from the second mounting, and the aperture (38) at the first mounting enables the cam to be drawn through it to disengage the brake camshaft from the first mounting.

5. An assembly according to claim 4 wherein the aperture (10) at the second mounting is a slot having an open end.

6. An assembly according to claim 4 or claim 5 wherein the aperture (13) at the first mounting is of a keyhole shape having a part-circular portion (14) with which the first bearing assembly (16) at the brake anchor bracket (8) is registered, and an extension portion (14') with which the cam (23) has to be aligned to allow withdrawal of the brake camshaft from the first mounting.

7. An assembly according to claim 5 wherein the aperture (10) at the second mounting (9) is of a keyhole shape having a part-circular portion (17) with which the second bearing assembly (21) is registered, and an extension portion (18) which extends to said open end and by way of which the brake camshaft (22) is able to be tilted to be withdrawn from the second mounting through said open end.

8. An assembly according to claim 1 wherein the aperture (38) at the first mounting is an open or openable slot which enables the brake camshaft (22) to be tilted to allow said remote end thereof to be withdrawn from the second mounting (9) and allows the brake camshaft to be drawn through it for disengagement from the first mounting.

9. An assembly according to claim 1 wherein both of the bearing assemblies (16;21) are adapted for self-alignment to accommodate misalignment at the brake anchor bracket (8;37) and allow for deflection of the axle beam (1) in use without imparting corresponding loading between the brake camshaft (22) and the bearing assemblies.

10. An assembly according to claim 9 wherein the bearing assemblies (16;21) are both of the spherical self-aligning type each comprising a housing (27;33) by which the bearing assembly is secured to the respective mounting, a part-spherical bush (28;34) which is tiltably located in the housing and receives the brake camshaft (22), and O-ring seals (36) on the brake camshaft provided in the housing at each end of the bush.

11. An assembly according to claim 5 wherein the aperture (13) at the first mounting is of a keyhole shape having a part-circular portion (14) with which the first bearing assembly (16) at the brake anchor bracket (8) is registered, and an extension portion (14') with which the cam (23) has to be aligned to allow withdrawal of the brake camshaft from the first mounting.

12. An assembly according to claim 11 wherein the aperture (10) at the second mounting (9) is of a keyhole shape having a part-circular portion (17) with which the second bearing assembly (21) is registered, and an extension portion (18) by way of which the brake camshaft (22) is able to be tilted to be withdrawn from the second mounting.

13. A vehicle axle beam and brake assembly comprising an internal shoe drum brake having brake shoes operated by a brake camshaft (22) supported for rotation by spaced first and second bearing assemblies (16;21) carried by an axle beam (1), the first bearing assembly (16) being supported on the axle beam by a brake anchor bracket (8;37), and the brake camshaft having adjacent and remote ends respectively near to and remote from the brake anchor bracket and a cam (23) at said adjacent end by means of which the brake shoes are caused to be actuated upon rotation of the brake camshaft, the first bearing assembly (16) being releasably mounted on a first mounting at the brake anchor bracket having a slot (13) through which the brake camshaft extends and shaped to enable the can (23) to pass through it for disengagement of the brake camshaft from the first mounting, and the second bearing assembly (21) being releasably secured to the axle beam at a second mounting (9) and having an aperture (10) through which the brake camshaft extends and which is open or openable laterally of the brake camshaft to enable the brake camshaft, with both of the bearing assemblies thereon, to be manoeuvred out of engagement with the mountings when the bearing assemblies have been released from the mountings.

14. A vehicle axle beam and brake assembly comprising an internal shoe drum brake having brake shoes operated by a brake camshaft (22) supported for rotation by spaced first and second bearing assemblies (16;21) carried by an axle beam, (1), the first bearing assembly (16) being supported on the axle beam by a brake anchor bracket (8,37), and the brake camshaft having adjacent and remote ends respectively near to and remote from the brake anchor bracket and a cam (23) at said adjacent end by means of which the brake shoes are caused to be actuated upon rotation of the brake camshaft, the first bearing assembly (16) being releasably mounted on a first mounting at the brake anchor bracket having an aperture (13) through which the brake camshaft extends, the second bearing assembly (21) being releasably secured to the axle beam at a second mounting (9) having an aperture (10) through which the brake camshaft extends, the aperture (13) of the first mounting being open or openable laterally of the brake camshaft to enable the brake camshaft with the first bearing assembly (16) thereon to be separated from the first mounting by lateral movement of the brake camshaft relative to the first mounting when the first bearing assembly has been released from the first mounting, and the brake camshaft with the second bearing assembly (21) thereon being manoeuvrable out of engagement with the second mounting when the second bearing assembly has been released from the second mounting and the brake camshaft has been separated laterally from the first mounting.

* * * * *